United States Patent
Sjöblom et al.

(10) Patent No.: US 12,516,473 B2
(45) Date of Patent: Jan. 6, 2026

(54) ARRANGEMENT AND METHOD FOR PRETREATMENT OF BIOMASS

(71) Applicant: Sekab E-Technology AB, Örnsköldsvik (SE)

(72) Inventors: Anders Sjöblom, Bonässund (SE); Elias Sundvall, Domsjö (SE); Adnan Cavka, Arnäsvall (SE)

(73) Assignee: Sekab E-Technology AB, Örnsköldsvik (SE)

( * ) Notice: Subject to any disclaimer, the term of this patent is extended or adjusted under 35 U.S.C. 154(b) by 537 days.

(21) Appl. No.: 17/759,561

(22) PCT Filed: Feb. 2, 2021

(86) PCT No.: PCT/EP2021/052421
§ 371 (c)(1),
(2) Date: Jul. 27, 2022

(87) PCT Pub. No.: WO2021/156246
PCT Pub. Date: Aug. 12, 2021

(65) Prior Publication Data
US 2023/0098986 A1 Mar. 30, 2023

(30) Foreign Application Priority Data
Feb. 3, 2020 (EP) ................................. 20155121

(51) Int. Cl.
*D21C 7/12* (2006.01)
*D21C 1/02* (2006.01)
*D21C 7/00* (2006.01)

(52) U.S. Cl.
CPC ............... *D21C 7/12* (2013.01); *D21C 1/02* (2013.01); *D21C 7/00* (2013.01)

(58) Field of Classification Search
None
See application file for complete search history.

(56) References Cited

U.S. PATENT DOCUMENTS

| 2,531,257 A | | 11/1950 | Cowherd |
| 2,887,427 A | * | 5/1959 | Bennett ............... D21C 7/12 |
| | | | 236/46 C |
| 2,896,709 A | * | 7/1959 | Ehrisman ............ D21C 3/228 |
| | | | 162/238 |

(Continued)

FOREIGN PATENT DOCUMENTS

| CA | 1029587 A | | 4/1978 | |
| GB | 1107465 A | * | 3/1968 | ............... B01J 3/00 |
| WO | WO-2020005130 A1 | * | 1/2020 | ............... B01J 19/20 |

OTHER PUBLICATIONS

Smook, Handbook for Pulp and Paper Technologists, 1992, Angus Wilde Publications, 2nd edition, chapter 8. (Year: 1992).*

(Continued)

*Primary Examiner* — Anthony Calandra
(74) *Attorney, Agent, or Firm* — Myers Bigel, P.A.

(57) ABSTRACT

The present disclosure generally relates to a pretreatment arrangement (100) for pretreatment of lignocellulosic biomass comprising a reactor vessel (101) having an upstream inlet (102) for receiving biomass and a downstream outlet (103) for discharging biomass. The pretreatment arrangement (100) further comprises a gas valve (104) and gas flow control means (106).

15 Claims, 5 Drawing Sheets

(56) References Cited

U.S. PATENT DOCUMENTS

| | | | | | |
|---|---|---|---|---|---|
| 3,817,824 | A | * | 6/1974 | Marks | D21C 7/12 |
| | | | | | 162/239 |
| 3,928,123 | A | * | 12/1975 | Marks | D21C 3/22 |
| | | | | | 137/87.03 |
| 4,259,151 | A | | 3/1981 | Gordy | |
| 5,674,360 | A | * | 10/1997 | Wyllie | D21C 7/06 |
| | | | | | 162/52 |
| 2008/0257511 | A1 | * | 10/2008 | Thorgersen | D21C 7/00 |
| | | | | | 162/244 |
| 2011/0236946 | A1 | * | 9/2011 | Maclachlan | C12P 7/08 |
| | | | | | 435/167 |

OTHER PUBLICATIONS

Smook, Handbook for Pulp and Paper Technologists, 1992, Angus Wilde Publications, 2nd edition, chapter 24 (Year: 1992).*
"International Search Report and Written Opinion corresponding to International Application No. PCT/EP2021/052421 mailed Mar. 29, 2021".
"International Preliminary Report on Patentability corresponding to International Application No. PCT/EP2021/052421 mailed Aug. 18, 2022".

* cited by examiner

ARRANGEMENT AND METHOD FOR PRETREATMENT OF BIOMASS

STATEMENT OF PRIORITY

This application is a 35 U.S.C. § 371 national phase application of PCT Application No. PCT/EP2021/052421 filed Feb. 2, 2021, which claims priority to European Application No. 20155121.5 filed Feb. 3, 2020, the entire contents of each of which are incorporated by reference herein.

TECHNICAL FIELD

The present disclosure generally relates to an arrangement and a method for pretreatment of lignocellulosic biomass in a reactor vessel having an upstream inlet for receiving biomass and a downstream outlet for discharging biomass.

BACKGROUND

Lignocellulosic residues from forestry are attractive as feedstocks for the production of green chemicals and fuels, since they are abundant, relatively inexpensive, and not used for food. Lignocellulose consists mainly of lignin and two classes of polysaccharides, cellulose and hemicellulose. The polysaccharides can be hydrolyzed to sugars and converted to various fermentation products, e.g. bioalcohols, by means of fermenting microorganisms, such as *Saccharomyces cerevisiae*.

The hydrolysis of cellulose is typically preceded by a pretreatment process, in which the hemicellulose is degraded, and the cellulose is made more accessible to cellulolytic enzymes. During hydrolysis, the cellulose present is partly converted into reducing sugars.

The pretreatment is considered a critical part in the process of converting biomass into fermentation products, mainly because it affects downstream processes and determines the ultimate sugar yields. A variety of pretreatment processes exist, many of which rely on high temperature treatments and high pressures.

The pretreatment process is typically carried out in a pretreatment arrangement, such as a pretreatment reactor. The pretreatment reactor generally comprises an inlet for receiving the biomass to be pretreated and an outlet for discharging the pretreated biomass, and a closed vessel wherein the pretreatment process is carried out.

The overall aim of the pretreatment is to disrupt the crystalline cellulose structure and to remove or partially remove lignin from the lignocellulosic biomass. The pretreatment process is complex and involves many reactions and side-reactions. Such reactions may result in the formation of various by-products, which may be inhibitory to downstream processes. Furthermore, volatile compounds and gases contained in the lignocellulose biomass are set free when the material is degraded or partially degraded. Gases may accumulate in a portion of the reactor above the biomass slurry level.

Some pretreatment methods, such as steam explosion, involves deliberately increasing the pressure and temperature within the reactor. Steam and gaseous catalysts, such as sulfur dioxide ($SO_2$) or carbon dioxide ($CO_2$) may be added to catalyze the reaction. The addition of steam and gaseous catalysts may result in an excess amount of gas accumulating in the reactor.

Pretreatment under harsh conditions is associated with problems such as undesirable fluctuations in the temperature and pressure conditions within the reactor. The stability of the process conditions within the reactor is thereby impaired. An effect of such imbalanced or unstable reaction conditions is that the pretreatment process becomes less efficient, i.e. provides a lower yield. Another effect is that deposits may form on the reactor walls.

There is a need for improvements with respect to preventing the formation of deposits during pretreatment and for overcoming problems with reaction fluctuations. Particularly, there is a need to provide a pretreatment system that is stable and controlled and which allows for the pretreatment process to be carried out in a consistent and reliable manner.

SUMMARY

In view of the above, it is an object of the present invention to provide improvements with respect to methods and arrangements for pretreatment of lignocellulosic biomass, particularly to achieve more stable reaction conditions within the reactor during operation and reducing the formation of deposits within the reactor.

According to a first aspect of the present invention, there is provided a pretreatment arrangement for pretreatment of lignocellulosic biomass material comprising a reactor vessel having an upstream inlet for receiving biomass and a downstream outlet for discharging the biomass, a gas valve arranged to remove gas from the reactor vessel and having an adjustable opening configuration, measuring means arranged for measuring a number of process parameters of the pretreatment in the reactor vessel, which process parameters include at least a temperature parameter and a pressure parameter, and gas flow control means configured to adjust the outflow of gas from the gas valve in response to the measured process parameters, whereby a controlled flow of gas out from the reactor vessel is achieved.

The present inventive concept is based on the understanding that problems with unstable pretreatment conditions are mainly related to accumulation of gases in the reactor vessel and with the increase of temperature and pressure, respectively, in the reactor vessel due to the accumulation of gases.

The present invention provides for a controlled removal of gases from the reaction vessel, through an adjustable gas valve and based on measurements of the pretreatment temperature and pressure, resulting in a controlled pretreatment. The temperature and pressure have been identified as key parameters, together sufficient for achieving stable pretreatment conditions, which implies an efficient pretreatment and reduced formation of deposits on the interior walls of the reactor.

According to preferred embodiments, the pretreatment arrangement comprises gas flow control means configured to adjust the outflow of gas from the gas valve in response to the relationship between the temperature and pressure, e.g. expressed as a ratio between temperature and pressure, so as to achieve a controlled flow of gas out from the reactor vessel.

In other preferred embodiments, the gas flow control means is configured to determine a ratio between the temperature parameter and the pressure parameter and adjust the outflow of gas from the gas valve in response to the determined ratio. The gas flow control means may be configured to adjust the outflow of gas from the gas valve if the determined ratio deviates from a predetermined reference ratio, e.g. expressed as an interval, for the pretreatment.

In embodiments, the gas flow control means is configured to adjust the outflow of gas from the gas valve if the determined ratio deviates from a predetermined reference ratio by more than 5%, such as by more than 10%.

By adjusting the outflow of gas from the gas valve in response to the relationship between the temperature and pressure, the temperature and pressure, or the ratio between temperature and pressure, can be held within a predetermined interval of deviation (basically constant, if the interval is comparatively narrow) for the specific pretreatment to be carried out.

Such pretreatment arrangements will counteract or compensate for imbalance between the temperature and pressure within the reactor caused by the liberation of gases from the biomass during degradation or partial degradation, and which is particularly problematic if the pretreatment is carried out by applying steam or additional catalysts, particularly gaseous catalysts, leading to an excess amount of accumulated gases in the reactor.

In embodiments, the measuring means is configured for monitoring the process parameters in a continuous or semi-continuous manner and the gas flow control means is configured to automatically adjust the opening of the gas valve in response to the monitored process parameters.

In embodiments, the process parameters measured with the measuring means further comprise a gas parameter indicating the amount or concentration of gas in the reactor vessel.

This allows for a more sophisticated and controlled removal of gases from the reactor vessel, and thus also a more controlled pretreatment.

In embodiments, the measuring means comprises a flow meter configured to measure the outflow of gas from the reactor vessel and the gas flow control means is configured to adjust the opening of the gas valve also in response to the measured outflow of gas.

In embodiments, the reactor vessel is a vertical reactor vessel extending along a longitudinal center line and comprising an upper portion and a lower portion, the gas valve being arranged in the upper portion of the reactor vessel or outside of the reactor vessel but in direct gas communication with the upper portion of the reactor vessel, the upper portion of the reactor vessel being above the level of biomass in the reactor vessel when the pretreatment arrangement is in operation.

In embodiments, the pretreatment involves steam explosion. The pretreatment arrangement may be adapted for steam explosion downstream or in an outlet region, i.e. in or close to the outlet, of the reactor vessel.

As mentioned, during steam explosion, steam and additional acid catalysts are added, which may result in an excess amount of gas accumulating in the reactor vessel. The incorporation of a gas valve is therefore an efficient means to control the process fluctuations within the reactor and to provide a stable and efficient pretreatment.

In embodiments, a pretreatment arrangement with steam explosion comprises a sluice vessel configured to discharge biomass received from the outlet of the reactor vessel, wherein the sluice vessel is arranged in fluid communication with and downstream of the reactor vessel. The sluice vessel comprises a separate vessel or compartment, arranged with sluice means (valves) so as to be able to have a different pressure than the pressure within the reactor vessel.

The sluice vessel secures an improved discharge of pretreated biomass from the reactor vessel and is particularly advantageous for pretreatment processes involving steam explosion. If the pretreatment involves steam explosion, such a process poses demands on the equipment utilized. The high temperatures and pressures used within the reactor may result in the formation of deposits within the reactor, and such deposits may build up on the reactor walls. The provision of a sluice vessel allows the biomass to first be treated in the reaction vessel under optimum conditions for pretreatment (suitable time, pressure, temperature, etc.), and subsequently, the pressure may be increased within the sluice vessel; i.e. outside of the reactor vessel. Upon discharge from the sluice vessel, the pressure drops and results in division of the material into smaller particles. Accordingly, the "harsh" process conditions associated with large pressure variations, are performed separate from the reactor vessel, and the burning or charring of sugars and biomass within the reactor vessel, can be avoided. The discharge of biomass is therefore performed in a controlled and improved manner.

In embodiments, the pretreatment arrangement further comprises a scraping device configured to scrape deposits formed on the interior walls of the reactor vessel. The scraping device may be arranged in the reactor vessel to prevent the formation of deposits on the interior reactor walls and to scrape off deposits potentially formed.

According to another aspect of the present invention, there is provided a method for controlled pretreatment of lignocellulosic biomass, wherein the method comprises the steps of:

pretreating a lignocellulosic biomass material in a pretreatment arrangement comprising a reactor vessel having an upstream inlet for receiving biomass and a downstream outlet for discharging the biomass and a gas valve arranged to remove gas from the reactor vessel and having an adjustable opening;

measuring a number of process parameters of the pretreatment in the reactor vessel, which process parameters include at least a temperature parameter and a pressure parameter; and adjusting the outflow of gas from the gas valve in response to the measured process parameters.

In embodiments, the method comprises determining a ratio between the pressure parameter and the temperature parameter and adjusting the outflow of gas from the gas valve in response to the determined ratio. The step of adjusting may in such cases comprise comparing the determined ratio to a predetermined reference ratio for the pretreatment and adjusting the outflow of gas from the gas valve if the determined ratio deviates from the predetermined reference ratio, such as by more than 5%, such as by more than 10%.

In embodiments, the step of measuring comprises monitoring the process parameters in a continuous or semi-continuous manner and the step of adjusting comprises automatically adjusting the gas valve opening in response to the monitored process parameters.

In embodiments, the method further comprises setting a lower limit for the outflow of gas from the gas valve, so as to enable a continuous outflow of gas from the gas valve during the pretreatment.

In embodiments, the process parameters measured further include a gas parameter indicating the amount or concentration of gas in the reactor vessel.

In embodiments, the method further comprises measuring the outflow of gas from the reactor vessel and adjusting the opening of the gas valve in response also to the measured outflow of gas.

BRIEF DESCRIPTION OF THE DRAWINGS

The various aspects of the present invention, including its particular features and advantages, will be readily understood from the following detailed description and the accompanying drawings, in which.

DETAILED DESCRIPTION

The present invention will now be described more fully hereinafter with reference to the accompanying drawings. The present invention may, however, be embodied in many different forms and should not be construed as limited to the embodiments set forth herein; rather, these embodiments are provided for thoroughness and completeness, and fully convey the scope of the present invention to the skilled person.

Figure 1:
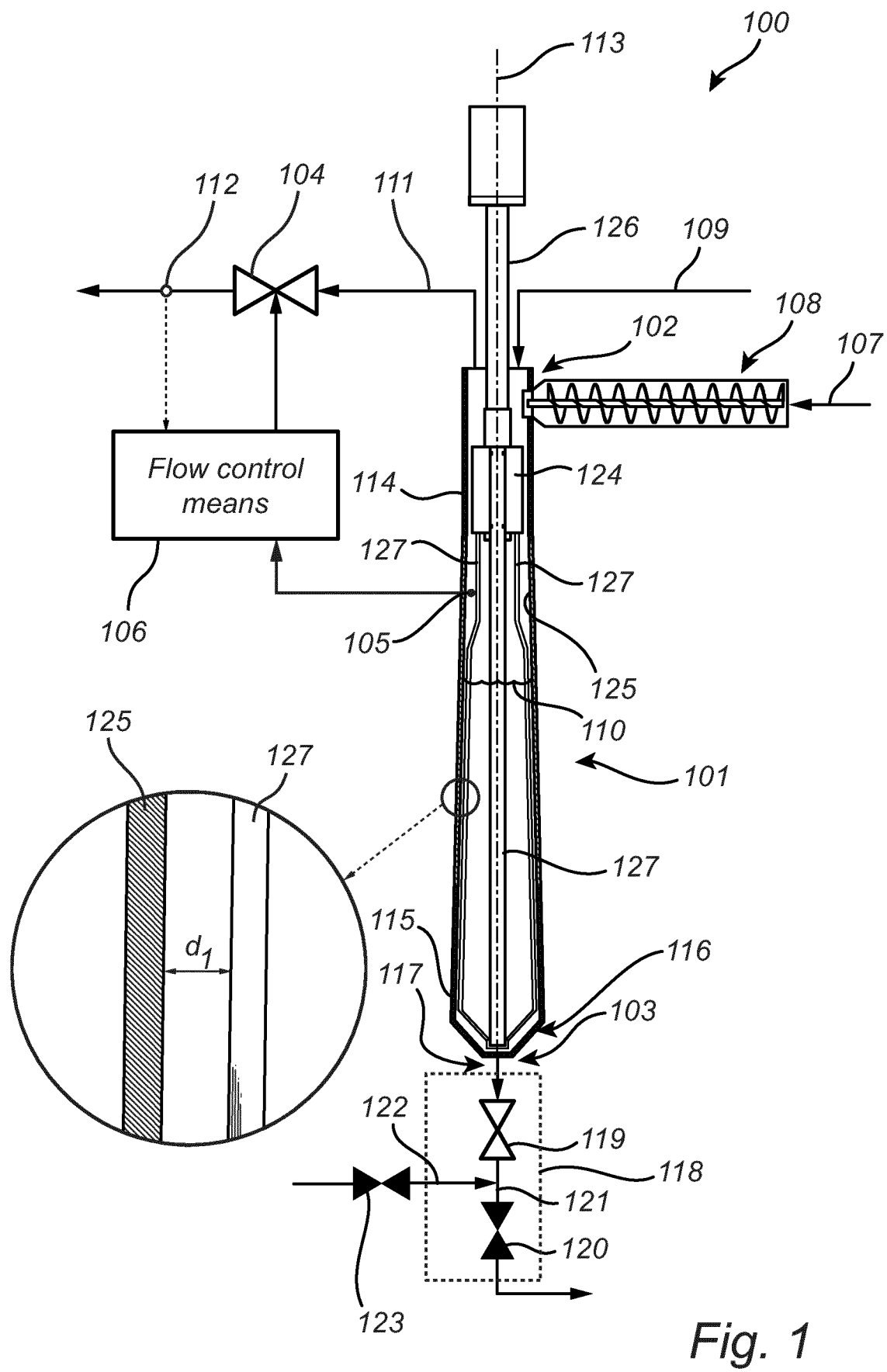
FIG. 1 illustrates a pretreatment arrangement according to an exemplary embodiment of the present invention.

FIG. 1 illustrates a pretreatment arrangement 100 for pretreatment of lignocellulosic biomass comprising a reactor vessel 101 having an upstream inlet 102 for receiving biomass and a downstream outlet 103 for discharging biomass, wherein the pretreatment arrangement 100 comprises a gas valve 104 configured to remove gas from the reactor vessel 101, measuring means 105 for measuring at least the temperature and pressure in the pretreatment reactor, and gas flow control means 106 configured to adjust the outflow of gas from the gas valve 104 in response to the measured process parameters.

Lignocellulosic biomass 107 enters the reactor vessel 101 by means of the inlet 102. In FIG. 1, the biomass 107 is fed into the reactor vessel 101 by means of a plug screw feeder 108. The plug screw feeder 108 secures an even flow of biomass into the reactor vessel 101. The pretreatment arrangement 100 is not limited to a specific type of inlet or feeding means, but any inlet or means for feeding biomass, known to those skilled in the art, may be used.

The lignocellulosic biomass may be, but is not limited to, hardwoods, softwoods, sugarcane bagasse, energy cane, corn stover, corn cobs, corn fibers, straw from rice, wheat, rye and other crop or forestry residues.

As illustrated by the arrow 109, steam and/or additional catalysts may in embodiments be added to the reactor vessel 101 for certain pretreatment conditions.

During operation, the reactor vessel 101 content can be divided into a gas phase arranged above the biomass slurry level 110 and a biomass slurry phase, wherein the reactions for degrading or partially degrading the lignocellulosic biomass take place.

During such reactions, and particularly when additional steam 109 or gases are introduced into the reactor vessel 101, an excess amount of gases are concentrated in the gas phase of the reactor vessel 101.

During degradation of the lignocellulosic biomass, chemical bonds are broken and may result in the liberation of volatile compounds (VOC) and gases. Such gases are typically inert gases; i.e. gases that have no or extremely low chemical reactivity with other substances. Examples of inert gases include e.g. nitrogen ($N_2$) and carbon dioxide ($CO_2$). If sulphur dioxide ($SO_2$) is used to catalyze the pretreatment reaction, $SO_2$ may also become concentrated in the gas phase of the reactor vessel 101.

As described above, an unstable pretreatment is less efficient, i.e. provides a lower yield, and also leads to problems such as build-up of deposits on the inner walls of the reactor vessel. The present inventors have realized that problems with unstable pretreatment conditions are very much associated with accumulation of gases, primarily inert gases, in the reactor vessel and with the increase of temperature and pressure, respectively, in the reactor vessel due to the accumulation of gases.

The present invention is based on the recognition that a controlled removal of gases (mainly comprising inert gases formed during pretreatment), can provide for a stable pretreatment. More specifically, controlled gas removal from the reactor vessel through an adjustable gas valve and based on measurements of the temperature and pressure of the reactor vessel is proposed. The temperature and pressure have been identified as key parameters for achieving stable pretreatment conditions. According to preferred embodiments, the pretreatment arrangement comprises gas flow control means configured to adjust the outflow of gas from the gas valve in response to the relationship between the temperature and pressure, e.g. expressed as a ratio between temperature and pressure, so as to achieve a controlled flow of gas out from the reactor vessel.

Figure 2:
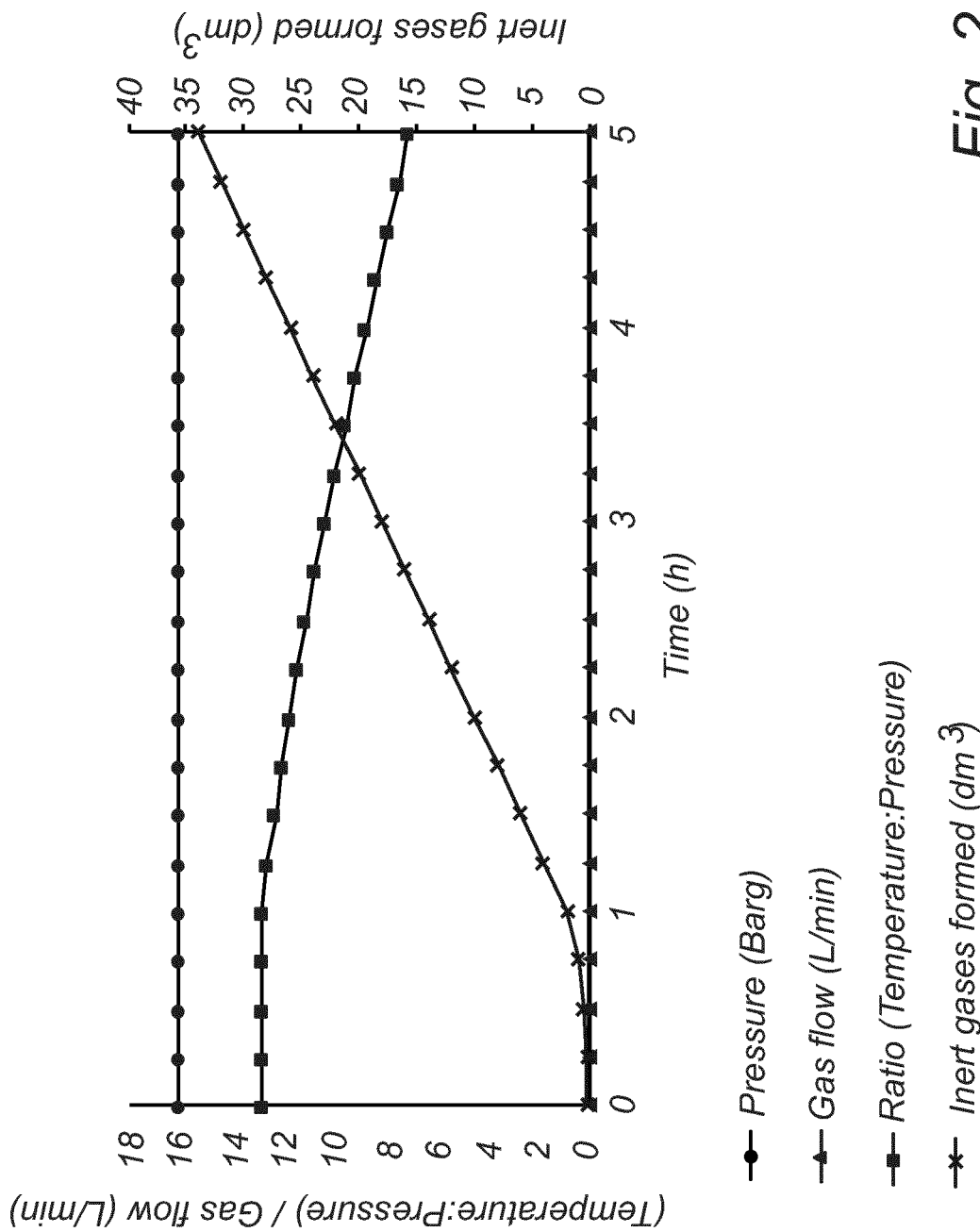
FIG. 2 is a schematic exemplary diagram to illustrate the general relationship between gas formation and temperature and pressure in a conventional pretreatment arrangement.

FIG. 2 is a schematic exemplary diagram to illustrate the general relationship between gas formation and temperature and pressure in a conventional pretreatment arrangement without gas removal. As evident from the curve, the gas flow out from the reactor vessel is zero. As the gas amount in the reactor vessel increases, the relationship between temperature and pressure, here exemplified as a temperature to pressure ratio, changes. For illustrative purposes, pressure is kept constant in the theoretical simulation of FIG. 2 (e.g. corresponding to a process control mechanism involving a constant desired (target) pressure value) and it is evident that the temperature to pressure ratio is not constant. The temperature to pressure ratio decreases as inert gases accumulate in the reactor.

Figure 3:
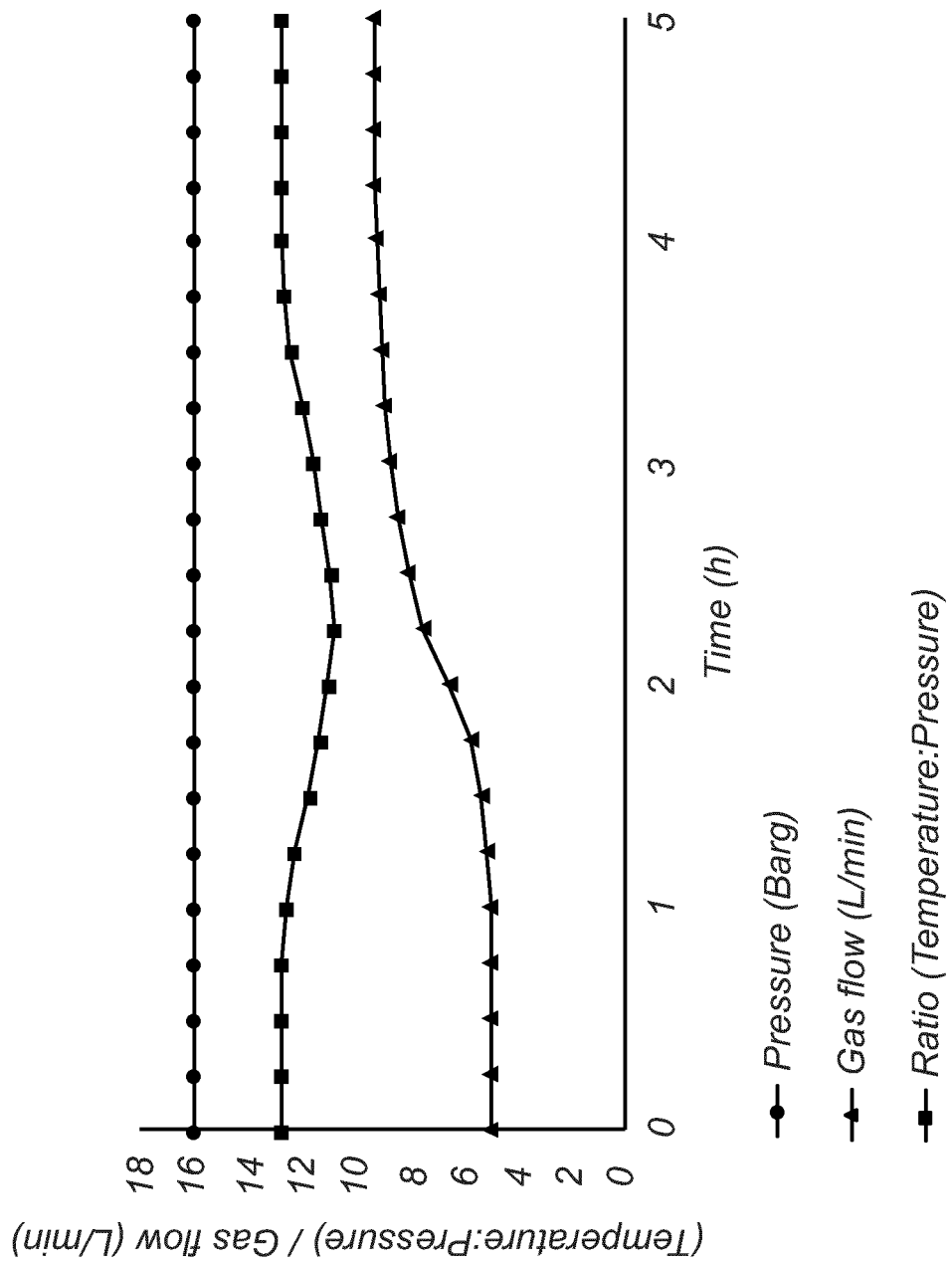
FIG. 3 is a schematic exemplary diagram to illustrate the relationship between gas flow and temperature and pressure in a pretreatment arrangement according to an exemplary embodiment of the present invention.

FIG. 3 is a schematic exemplary diagram to illustrate the relationship between gas flow and temperature and pressure in a pretreatment arrangement with controlled removal of gas according to an exemplary embodiment of the present invention. Also in the theoretical simulation of FIG. 3, the pressure in the reactor is the same throughout the process. The gas flow control means is configured so as to adjust the gas flow in response to the temperature and pressure. The control criterion is to keep the ratio between temperature and pressure within a predetermined reference ratio interval. When the ratio determined from temperature and pressure measurement deviates too much, the outflow of gas from the gas valve is changed to counteract the deviation. In FIG. 3, the ratio between temperature and pressure first decreases but as the gas flow, due to the gas flow control means of the invention, increases, the ratio gradually goes back to its desired value or interval and a steady-state condition between gas flow and temperature/pressure-ratio is achieved. Such a steady-state may prevail until there is another change in the relationship between pressure and temperature, for example due to a change in the accumulated gases in the reactor caused by altered reaction conditions, process disturbances, variations in the incoming lignocellulosic material, etc.

Returning to FIG. 1, some features and embodiments of the pretreatment arrangement will now be described more in detail.

The measuring means 105 for measuring the temperature and pressure within the reactor vessel is configured to measure the temperature at a plurality of points in time, preferably continuously, within the reactor vessel 101 and to measure the pressure at a plurality of points in time, preferably continuously, within the reactor vessel 101.

The measuring means 105 typically comprises conventional temperature and pressure sensors, arranged to measure the temperature and pressure, respectively, within the reactor vessel 101 and communicate the registered temperature and pressure signals to the gas flow control means 106. The temperature and pressure sensors are arranged in an upper portion 114 of the reactor vessel, above the biomass slurry level 110.

The gas flow control means 106 is configured to adjust the outflow of gas from the gas valve 104 in response to the measured temperature, pressure, and, possibly other process parameters. The gas flow control means 106 typically comprises conventional control means arranged so as communicate with and collect signals from the measuring means 105, 112 and to send control signals to the gas valve 104, or, alternatively, to an intermediate valve adjustment device (not shown), in order to adjust the opening of the gas valve 104.

The gas flow control means 106 preferably comprises automated control means, such as computer control means, suitable for online or inline pretreatment control.

The gas valve 104 is arranged in gas communication with the reaction vessel 101 so as to secure proper removal of gases. More specifically, the gas valve 104 is arranged in gas communication with the portion of the reaction vessel which, during operation, contains the gas phase of the reactor vessel content.

The gas valve 104 may be attached to the reactor vessel 101 or it may be connected to the reactor vessel 101 by means of a pipe, a tube, or another connecting means.

The gas valve 104 may also be arranged in the reactor vessel 101 or extend into the reactor vessel 101. In FIG. 1, the gas valve 104 is arranged outside of the reactor vessel 101 and connected to the reactor vessel by means of e.g. a pipe. The outflow of gas is illustrated by the arrow 111.

The gas valve 104 has an adjustable opening configuration, i.e. the degree of opening of the gas valve 104 and/or the time of opening of the gas valve 104 is adjustable. The gas valve 104 may be operable between an open and closed configuration in a "1/0", stepwise, or stepless manner.

In some embodiments, the gas valve 104 is configured to be operable between an open and a closed position. A flexible, yet controlled system is thereby achieved which allows for quick adjustments or "corrections" of reaction conditions within the reactor vessel 101. It also allows for energy savings, since the gas valve 104 may be kept in a closed position when there is no need for gas removal from the reactor vessel 101.

In alternative embodiments, the gas valve 104 is configured to remove gas continuously from the reactor vessel 101. This may be beneficial for certain pretreatment processes, such as steam explosion, where there is also an inflow of additional steam and, potentially gas catalysts, which can disrupt the balance within the reactor vessel 101. A small, continuous outflow of gas may then compensate for these fluctuations and re-establish the constant and stable pretreatment conditions within the reactor vessel. Thus, it may be beneficial for the gas flow control means 106 to set a minimum outflow of gas, which the system is not to go below.

The skilled person understands that the gas flow rate may depend for example on reactor size, raw material, pressure.

The present disclosure is not limited to a specific type of valve, and, as evident to the skilled person, the type of valve used may depend for example on the process conditions and method for pretreatment and whether the reactor is used for large-scale or small-scale pretreatment processes. In particular, the size and shape of the reactor vessel may affect which type of valve is suitable.

Exemplary valves include solenoid valve, needle valve, pinch valve, ball valve, globe valve, knife valve, spool valve, butterfly valve, choke valve, diaphragm valve, membrane valve, gate valve, piston valve, and plug valve.

In preferred embodiments, the gas valve 104 is a control valve, i.e. a valve with variable and controllable degree of opening. The control valve is configured with an adjustable, stepwise or stepless, opening for the gas outflow, not just a 1/0 or on/off ("1/0") mode. In embodiments, the control valve is a globe valve, a ball valve, or a needle valve.

In embodiments with relatively small reactors and low flow rates, the gas valve 104 could for example be a needle valve. A needle valve typically comprises a small port and a threaded, needle-shaped plunger and allows for precise control of the gas outflow where a relatively low flow rate is desired.

In embodiments, the pretreatment arrangement further comprises an optional flow meter 112 configured to measure the outflow of gas from the reactor vessel 101. The gas flow control means 106 is then configured to adjust the opening of the gas valve 104, i.e. to increase or decrease the outflow of gas from the reactor vessel 101, also in response to the measured outflow of gas.

For example, if the flow meter 112 indicates that there is an improper flow of gas (either too much or too low), the gas valve 104 may be opened or closed in response to such indications. This may be beneficial to secure that energy is not lost or "wasted" during the reaction. A cost-efficient and precisely controlled approach is thereby achieved.

If the outflow of gas from the reactor vessel 101 is too high, the pressure within the reactor may drop too fast, which in turn can lead to excessive boiling of the slurry. It may therefore be advantageous to have a relatively low outflow of gas.

A possible approach for the gas flow control means 106 would be to control the removal of gases such that a desired ratio between temperature and pressure, as well as a desired interval for the actual flow of gas, detected by the flow meter 112, is achieved or targeted. This may be beneficial to secure stable reaction conditions, efficient pretreatment performance and energy-efficient pretreatment. A cost-efficient and adequately controlled pretreatment process can thereby be achieved.

The gas valve 104 and the flow meter 112 may be arranged within the same unit or may be connected by means of a pipe or tube. In the example of FIG. 1, the gas valve 104 and the flow meter 112 are arranged separately, but in gas communication. The flow meter 112 may be arranged upstream or downstream of the gas valve 104. In the example of FIG. 1, the flow meter 112 is arranged downstream of the gas valve 104 and adapted to measure the outflow of gas from the gas valve 104.

The pretreatment arrangement 100 is not limited to the use of a specific flow meter 112, but any type of flow meter suitable for measuring the outflow of gas from the reactor vessel 101 may be used.

The flow meter 112 may e.g. be selected from a differential pressure flow meter, a variable flow meter, a Coriolis flow meter, an ultrasonic flow meter, an optical flow meter or a thermal dispersion flow meter.

In embodiments, the flow meter 112 is a rotameter. The rotameter is a type of variable flow meter that measures the volumetric flow rate of the gas. A rotameter typically comprises a tapered tube with a "float"; i.e. at weight that is pushed upwards when the gas flow increases. The flow rate is measured by allowing the cross-sectional area that the gas travels through to vary.

The reactor vessel 101 in FIG. 1 is a vertical reactor vessel. However, the pretreatment arrangement of the present disclosure is not limited to the use of a vertical reactor vessel. Horizontal, as well as inclined, reactor vessels are also conceivable for the purpose of the present disclosure.

As illustrated in FIG. 1, the reactor vessel 101 is a vertical reactor vessel extending along a longitudinal center line 113 and comprising an upper portion 114, and a lower portion 115; the gas valve 104 or the pipe being arranged in the upper portion 114 of the reactor vessel 101.

The biomass 107 fed into the vertical reactor vessel 101 flows from the inlet 102 to the outlet 103 by means of gravity, and no additional means to increase the flow of biomass within the reactor vessel 101 is required. The gases formed in the reactor vessel 101 during the pretreatment reactions assemble in the upper portion 114 of the reactor vessel 101, i.e. above the biomass slurry level. The gas valve 104 or pipe for removing gases is therefore arranged in the upper portion 114 of the reactor vessel 101 to secure efficient removal of gas (not slurry) from the reactor vessel 101.

As mentioned, the upper portion 114 of the reactor vessel 101 corresponds to the portion of the reactor vessel 101 arranged above the biomass slurry level 110 within the reactor vessel 101 during operation. The lower portion 115 of the reactor vessel 101 corresponds to the portion(s) of the reactor vessel 101 arranged below the biomass slurry level 110 within the reactor vessel 101 during operation. The interface between the upper 114 and the lower portion 115 may correspond to the maximum biomass slurry level during operation.

In embodiments, the upper portion 114 has a longitudinal extension corresponding to 10-50% of the maximum longitudinal extension of the reactor vessel 101 and the lower portion 115 has a longitudinal extension corresponding to 50-90% of the maximum longitudinal extension of the reactor vessel 101.

As illustrated in FIG. 1, the lower portion 115 advantageously tapers towards the outlet 103 of the reactor vessel 101. More specifically, the lower portion 115 is at least partly tapering towards the outlet. Preferably, at least a bottom portion 116 of the lower portion 115, i.e. the portion 116 in the vicinity of the outlet 103, is tapering. This is to facilitate and improve discharge of biomass 117 from the outlet 103.

Typically, the reactor vessel 101 has a circular or oval cross-section. The reactor vessel 101 may e.g. be cylindrical. In preferred embodiments, the reactor vessel 101 has a rotational symmetry with respect to the longitudinal center line 113.

The pretreatment arrangement of the present disclosure may be used for various types of pretreatment methods including both hydrothermal, chemical, physical and biological methods.

In embodiments, the pretreatment involves steam explosion. In other words, the pretreatment arrangement 100 comprises a steam explosion arrangement.

During steam explosion, an excess amount of gas may assemble in the reactor vessel, and the problems caused by these gases are particularly severe. Therefore, controlled gas removal in accordance in the present invention is suitable for steam explosion arrangements.

In embodiments, the pretreatment arrangement 100 comprises a sluice vessel 118 arranged downstream of and in fluid communication with the reactor vessel 101, wherein the sluice vessel 118 is configured to discharge biomass received from the outlet 103 of the reactor vessel 101. A sluice vessel 118 is advantageous for controlling the discharge of the pretreated lignocellulosic material 117 and for improving the control of the process conditions within the reactor vessel 101.

The sluice vessel 118 may comprise a first discharge valve 119, a second discharge valve 120 arranged downstream of the first discharge valve 119 and a compartment 121 arranged between the first 119 and the second 120 discharge valves. The sluice vessel 118 may further comprise means 122 for increasing the pressure in the compartment 121 of the sluice vessel 118. The means 122 for increasing the pressure may be a tube adapted to supply gas, e.g. steam to the compartment 121, and may e.g. comprise a valve 123 to control the supply of gas. The first 119 and the second 120 discharge valve are configured to be operable between an open and a closed position. Both discharge valves (119 and 120) are in a closed position when the pressure is increased in the compartment 121.

The provision of a sluice vessel 118 downstream of the reactor vessel 101 allows the pressure to be remained within the reactor vessel 101, while the pressure may be significantly increased and decreased in the sluice vessel 118. A pressure drop resulting from the discharge of biomass from the second discharge valve 120 of the sluice vessel 118 improves the division of the pretreated biomass 117 into smaller particles. The sluice vessel 118 may therefore be adapted for steam explosion. Performing the steam explosion outside of and downstream of the reactor vessel 101 is beneficial in that potential deposits resulting from harsh pretreatment conditions (high pressures and high temperatures) are prevented within the reactor vessel 101. By increasing the pressure inside the sluice vessel 118, a higher pressure drop is obtained when the biomass is discharged from the second discharge valve 120. As a result, the treated biomass will be divided into smaller pieces compared to if a direct discharge from the reactor vessel 101 is performed.

As illustrated in FIG. 1, the pretreatment arrangement may comprise a scraping device 124. The scraping device 124 secures a continuous flow of biomass in the reactor vessel 101, while scraping deposits formed on the interior walls 125 of the reactor vessel 101. The scraping device 124 prevents build-up of deposits inside the reactor vessel 101, and the full interior volume of the reactor vessel 101 can therefore be utilized for the pretreatment of lignocellulosic biomass.

The scraping device 124 comprises a shaft 126 and at least two scraping blades 127 extending from the shaft 126. The scraping blades 127 are preferably configured to follow the contour, without contacting the interior walls 125, of at least a portion of the lower portion 115 of the reactor vessel 101.

The shaft 126 may be arranged outside of the reactor vessel 101 or may be configured to extend into the upper portion 114 of the reactor vessel 101. Preferably, the shaft 126 does not extend into the lower portion 115 of the reactor vessel 101. In other words, the shaft 126 does not extend into a portion of the vessel where biomass slurry is present. The reason is that a shaft 126 extending into the biomass slurry may form an additional surface onto which deposit may form and develop.

The scraping blades 127 are arranged to rotate about the longitudinal center line 113, and are preferably arranged to provide an efficient scraping of the interior reactor walls 125 without risking that these become damaged by the blades. Therefore, a small gap should be provided between the scraping blades 127 and the interior walls 125.

In embodiments, the scraping blades 127 are arranged at a distance, d1, from the interior walls 125 of the reactor vessel 101, wherein the distance, d1, corresponds to from 0.5 to 20%, preferably from 2 to 15% of the diameter of the reactor vessel 101.

Figure 4:
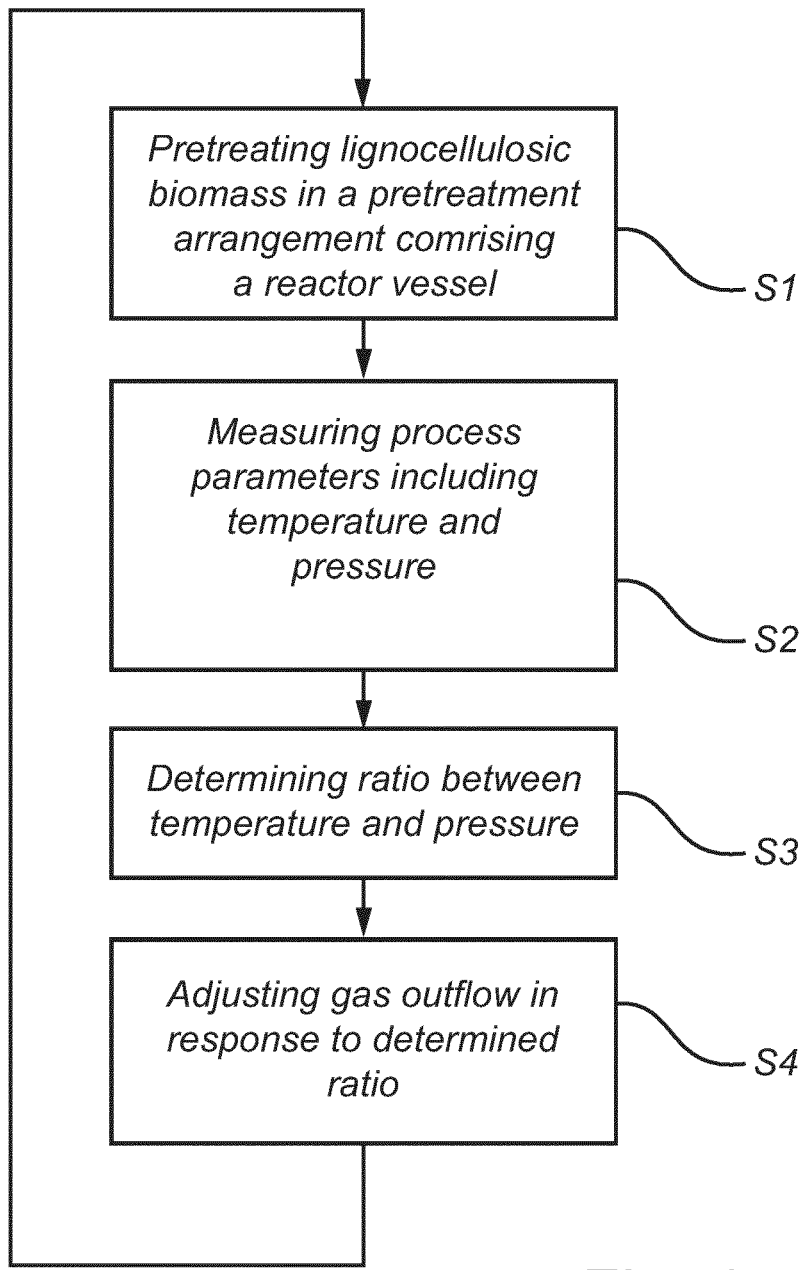
FIG. 4 schematically illustrates the steps of a method for controlled pretreatment to an exemplary embodiment of the present invention.

According to another aspect of the present disclosure, a method for controlling the outflow of gas in a pretreatment arrangement is proposed. FIG. 4 schematically illustrates the steps of a method for controlled pretreatment to an exemplary embodiment of the present invention. In step S1, a lignocellulosic biomass material is pretreated in a pretreatment arrangement comprising a reactor vessel and an adjustable gas valve arranged to remove gas from the reactor vessel. In step S2, a number of process parameters of the pretreatment in the reactor vessel are measured. The measured process parameters include at least a temperature parameter and a pressure parameter, based on which a ratio is determined in step S3. In step S4, the outflow of gas from the gas valve is adjusted in response to the determined ratio.

The temperature is preferably measured at a plurality of points in time, preferably continuously, within the reactor vessel. The pressure is preferably measured at a plurality of points in time, preferably continuously, within the reactor vessel.

The method is preferably automated and adapted for continuous operation. In embodiments, step S2 of measuring comprises monitoring the process parameters in a continuous or semi-continuous manner and the step of adjusting comprises automatically adjusting the gas valve opening in response to the monitored process parameters.

The adjustment in step S4 may comprise comparing the determined ratio to a predetermined reference ratio for the pretreatment and adjusting the outflow of gas from the gas valve if the determined ratio deviates from the predetermined reference ratio, such as by more than 5%, such as by more than 10%.

In embodiments, the reference ratio, $Q_{ref}$, represents the desired ratio between the pressure and temperature for the pretreatment in the reactor vessel, i.e. $Q_{ref}$=temp/P ratio or $Q_{ref}$=P/temp (where temp is the measured temperature or a parameter including or directly dependent on the measured temperature and P is the measured pressure or a parameter including or directly dependent on the measured pressure). $Q_{ref}$ may be a predetermined set value or interval, or, alternatively, be predetermined to be for example the ratio between the pressure and temperature at an initial stage of the pretreatment process.

In practice, the adjustment step will typically involve to increase the removal of gases (typically inert gases), i.e. increase the opening of the gas valve, when the pressure is too high, or, in other words, when the pressure due to gas accumulation has increased more than the temperature increase (non-linear relative to the temperature).

In embodiments, the process parameters measured in step S2 further include a gas parameter indicating the amount or concentration of gas, typically inert gases, in the reactor vessel.

Accordingly, a more sophisticated and controlled removal of gases from the reactor vessel, and thus also a more controlled pretreatment, can be achieved.

In embodiments, the method comprises measuring the outflow of gas, typically inert gases, from the reactor vessel and adjusting the opening of the gas valve in response also to the measured outflow of gas.

In embodiments, the method comprises setting a lower limit for the outflow of gas from the gas valve, so as to enable a continuous outflow of gas from the gas valve during the pretreatment.

The pretreatment control of the present invention is particularly well suited for steam explosion processes, which are typically associated with harsh reaction conditions and a lot of accumulated gases. Therefore, the method may with advantage include a steam explosion step.

The temperature in the reactor vessel during pretreatment with gas flow control in accordance with the present invention, may for example be in the interval of 185 to 225° C., such as 200 to 215° C.

The pressure in the reactor vessel during pretreatment with gas flow control in accordance with the present invention, may for example be in the interval of 10 to 25 bar, such as 15 to 20 bar.

Figure 5:
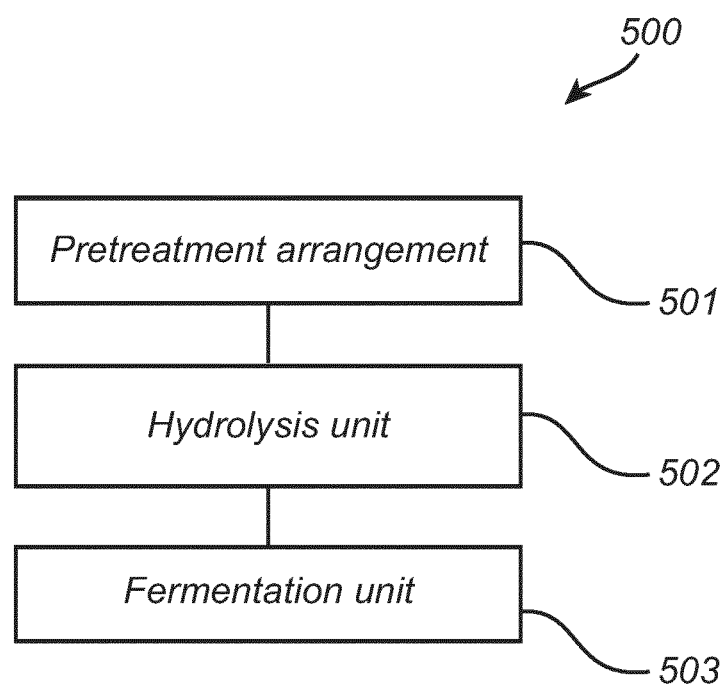
FIG. 5 schematically illustrates a system for treatment of lignocellulosic biomass according to the present disclosure.

With reference to FIG. 5, the present disclosure further provides a system 500 for treatment of lignocellulosic biomass comprising a pretreatment arrangement 501 for pretreatment of lignocellulosic biomass according to the first aspect of the present disclosure, a hydrolysis unit 502 arranged downstream of and in fluid communication with the pretreatment arrangement 501, and optionally, a fermentation unit 503, such as a fermentation vessel, arranged downstream of and in fluid communication with the hydrolysis unit 502. The system 500 may comprise additional units and components known to those skilled in the art. For example, a separation unit may be arranged between the pretreatment arrangement 501 and the hydrolysis unit 502, and/or between the hydrolysis unit 502 and the fermentation unit 503.

In the hydrolysis unit, the pretreated biomass is subject to enzymatic hydrolysis by means of saccharification enzymes. Fermentation of the hydrolysate into a target chemical is typically performed by means of fermenting organisms, such as bacteria and/or yeast. The system 500 may also comprise a product recovery unit, such as distillation or ion exchange chromatography, arranged downstream of and in fluid communication with the fermentation unit 503.

Terms, definitions and embodiments of the first aspect of the present disclosure apply mutatis mutandis to the other aspects of the present disclosure, and vice versa.

Even though the present disclosure has been described with reference to specific exemplifying embodiments thereof, many different alterations, modifications and the like will become apparent for those skilled in the art.

Variations to the disclosed embodiments can be understood and effected by the skilled addressee in practicing the present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A pretreatment arrangement (100) for pretreatment of lignocellulosic biomass material comprising
a reactor vessel (101) having an upstream inlet (102) for receiving lignocellulosic biomass and a downstream outlet (103) for discharging the lignocellulosic biomass,
a gas valve (104) arranged to remove gas from the reactor vessel and having an adjustable opening configuration,
measuring means (105, 112) arranged for measuring a number of process parameters of the pretreatment in the reactor vessel, which process parameters include at least a temperature parameter, a pressure parameter, and a gas parameter indicating the amount or concentration of gas in the reactor vessel (101), and
gas flow control means (106) configured to adjust the outflow of gas from the gas valve in response to the measured process parameters, whereby a controlled flow of gas out from the reactor vessel is achieved, and wherein the gas flow control means (106) is configured to determine a ratio between the temperature parameter and the pressure parameter and adjust the outflow of gas from the gas valve (104) in response to the determined ratio.

2. The pretreatment arrangement (100) according to claim 1, wherein the gas flow control means (106) is configured to adjust the outflow of gas from the gas valve (104) if the determined ratio deviates from a predetermined reference ratio for the pretreatment.

3. The pretreatment arrangement (100) according to claim 1, wherein the measuring means (105) is configured for monitoring the process parameters in a continuous or semi-continuous manner and the gas flow control means (106) is configured to automatically adjust the opening of the gas valve in response to the monitored process parameters.

4. The pretreatment arrangement (100) according to claim 1, wherein the measuring means (105, 112) further comprises a flow meter (112) configured to measure the outflow of gas from the reactor vessel (101) and the gas flow control means (106) is configured to adjust the opening of the gas valve (104) also in response to the measured outflow of gas.

5. The pretreatment arrangement (100) according to claim 1, wherein the reactor vessel (101) is a vertical reactor vessel extending along a longitudinal center line (113) and comprising an upper portion (114) and a lower portion (115), the gas valve (104) being arranged in the upper portion (114) of the reactor vessel (101) or outside of the reactor vessel (101) but in direct gas communication with the upper portion (114) of the reactor vessel (101), the upper portion (114) of the reactor vessel (101) being above the level of lignocellulosic biomass in the reactor vessel (101) when the pretreatment arrangement (100) is in operation.

6. The pretreatment arrangement (100) according to claim 1, wherein the pretreatment arrangement (100) is adapted for steam explosion downstream or in an outlet region of the reactor vessel (101).

7. The pretreatment arrangement (100) according to claim 1, further comprising a sluice vessel (118) configured to discharge lignocellulosic biomass received from the outlet (103) of the reactor vessel (101), wherein the sluice vessel (118) is arranged in fluid communication with and downstream of the reactor vessel (101).

8. The pretreatment arrangement (100) according to claim 1, wherein the reactor vessel (101) further comprises a scraping device (124) configured to scrape deposits formed on the interior walls (125) of the reactor vessel (101).

9. A method for controlled pretreatment of lignocellulosic biomass comprising the steps of:
pretreating (S1) a lignocellulosic biomass material in the pretreatment arrangement for pretreatment of lignocellulosic biomass material of claim 1 comprising the reactor vessel having the upstream inlet for receiving lignocellulosic biomass and the downstream outlet for discharging the lignocellulosic biomass and the gas valve arranged to remove gas from the reactor vessel and having the adjustable opening;
measuring (S2) the number of process parameters of the pretreatment in the reactor vessel, which process parameters include at least the temperature parameter, the pressure parameter, and the gas parameter indicating the amount or concentration of gas in the reactor vessel; and
adjusting (S4) the outflow of gas from the gas valve in response to the measured process parameters.

10. The method according to claim 9, comprising
determining (S3) a ratio between the pressure parameter and the temperature parameter and adjusting the outflow of gas from the gas valve in response to the determined ratio.

11. The method according to claim 10, wherein the step of adjusting (S4) comprises
comparing the determined ratio to a predetermined reference ratio for the pretreatment; and
adjusting the outflow of gas from the gas valve if the determined ratio deviates from the predetermined reference ratio by more than 5%, e.g. by more than 10%.

12. The method according to claim 9, wherein the step of measuring (S2) comprises
monitoring the process parameters in a continuous or semi-continuous manner and the step of adjusting (S4) comprises automatically adjusting the gas valve opening in response to the monitored process parameters.

13. The method according to claim 9, further comprising
setting a lower limit for the outflow of gas from the gas valve, so as to enable a continuous outflow of gas from the gas valve during the pretreatment.

14. The method according to claim 9, further comprising measuring the outflow of gas from the reactor vessel and adjusting the opening of the gas valve in response also to the measured outflow of gas.

15. The method according to claim 9, further comprising a steam explosion step.

* * * * *